Figure 1:
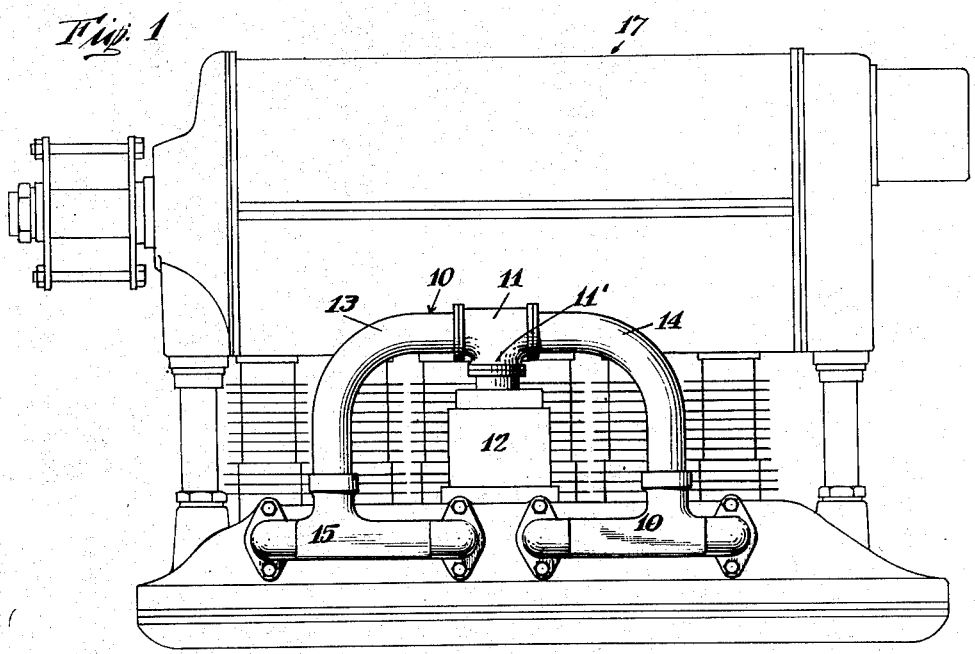

June 23, 1942.  A. T. GREGORY  2,287,609

MANIFOLD FOR INTERNAL COMBUSTION ENGINES

Filed July 27, 1940

INVENTOR
Alfred T. Gregory
BY
Hoguet, Neary & Campbell
his ATTORNEYS

Patented June 23, 1942

2,287,609

UNITED STATES PATENT OFFICE 2,287,609

MANIFOLD FOR INTERNAL COMBUSTION ENGINES

Alfred T. Gregory, Farmingdale, N. Y., assignor to Fairchild Engine and Airplane Corporation, Farmingdale, Long Island, N. Y., a corporation of Maryland Application June 27, 1940, Serial No. 347,827

8 Claims. (Cl. 123—52)

This invention relates to internal combustion engines and relates particularly to improvements in intake manifolds for such internal combustion engines.

It has been recognized that the length of intake manifolds for internal combustion engines exerts an influence on their operating characteristics and that long intake manifolds produce "ram" or supercharge in engines, thus increasing their power output. However, inasmuch as manifolds of this type must include long pipes, they are unwieldy and not readily applicable to engines used, for example, in airplanes and motor vehicles.

I have discovered that an even greater supercharging of internal combustion engines may be obtained through the use of manifolds of conventional shape, if, in accordance with my invention, they are constructed to take advantage of resonance and reinforcement by reflection of the pressure and rarifaction waves in the manifold pipe.

An object of the invention, therefore, is to provide simple and compact intake manifolds for internal combustion engines which improve the operation of the engines.

Another object of the invention is to provide intake manifolds which increase the power output of internal combustion engines by the controlled resonance and tuning of the manifold.

Another object of the invention is to provide intake manifolds that increase the volumetric efficiency to as much as 100% or more under ideal conditions.

Other objects of the invention will become apparent from the description of typical forms of devices embodying the invention.

In accordance with the present invention, my intake manifolds may be of the well-known T, inverted U or E shape having a carburetor at the center thereof or a supercharger for delivering fuel and air to one or more cylinders through each of the opposite branches thereof. The lengths of the branches of the manifold must be properly proportioned in order to have a resonance such that they are closely tuned to the frequency of the forcing or suction impulses of the engine or a multiple thereof at a desired engine speed. More particularly, a convenient length of each branch of the manifold pipe, dictated by the space afforded on the engine, may be on the order of ¼ of a wave length of the fundamental frequency of the manifold and this fundamental frequency should be substantially equal to the frequency of the forcing or suction impulses in each branch of the manifold, or a multiple thereof.

An increased effective pressure is generated by the reflection of pressure and rarifaction waves in the branches of the manifold pipe with such timing that they produce a high pressure condition at the entrance to the intake valves at the end of the suction stroke, and thus increase the supercharging effect.

Figure 2:
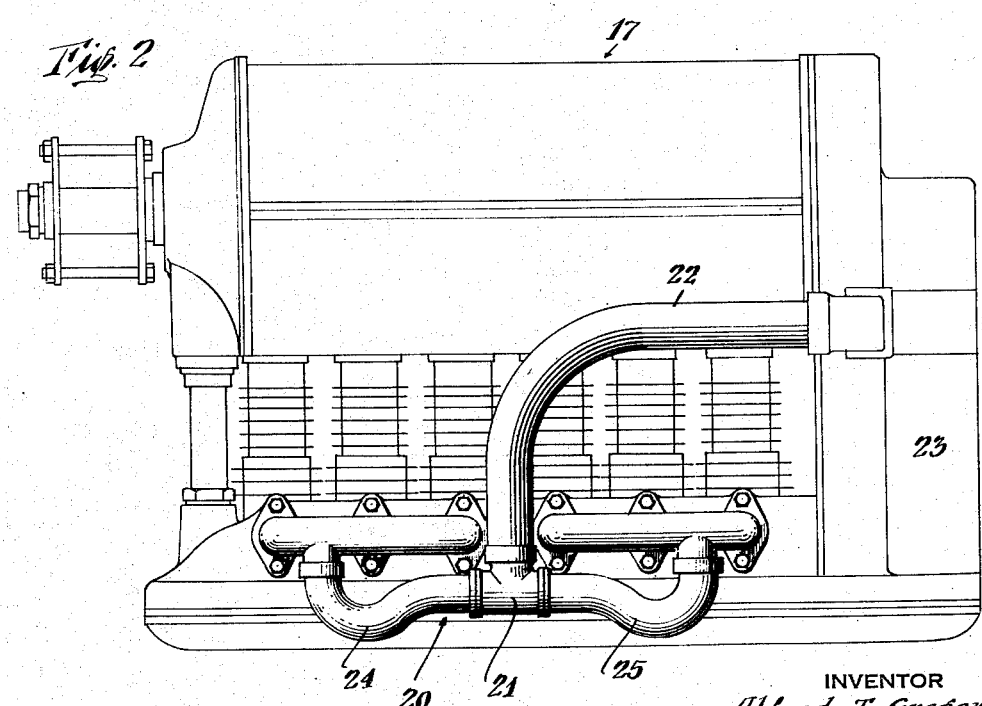

For a better understanding of the present invention, reference may be had to the accompanying drawing, in which:

Figure 1 discloses an internal combustion engine with a typical form of manifold embodying the invention connected thereto; and Figure 2 discloses an internal combustion engine having a manifold supplied by a supercharger, in accordance with the invention.

As shown in Figure 1, a typical manifold 10 which is of generally inverted U-shape formation is provided with an intake T 11 at the center thereof which has a leg 11' connected to the carburetor 12. The branches 13 and 14 of the manifold are connected to the T 11 and housings 15 and 16 respectively, each of which, in the form of the invention illustrated, communicates with the intake ports of three cylinders of a six cylinder engine 17.

It has been determined that a strong supercharging effect can be obtained by proportioning the manifold 10 so that its fundamental frequency is substantially twice the frequency of impulses in each branch of the manifold, although this will vary somewhat with changes in the diameter of the manifold, the piston displacement and the compression ratio. For example, in a typical manifold for a six-cylinder aeroplane engine the average length from the leg of the T 11' to the valves is 2.52 feet. This length corresponds to ¼ the resonant wave length in the manifold 10 which is, therefore, 10.1 feet. Utilizing 1060 feet per second as the velocity of sound in an air column, the fundamental frequency of vibration in the manifold, therefore, is 105 cycles per second. With this manifold the engine 17 developed maximum brake mean effective pressure at 1950 R. P. M. Inasmuch as there are three valves at the end of the branches 13 and 14 of the manifold 10 which open once during each two revolutions, the frequency of the suction impulses in each branch is:

$$\frac{1950 \times 3}{2 \times 60} = 49 \text{ cycles per second}$$

which is substantially one-half the resonant frequency of the manifold 10. It should be observed that the suction impulses in the opposite branches 13 and 14 of the manifold are 180° out of phase and that their points of application are one-half wave length apart, or 180° out of phase. Therefore, the impulses in one branch are actually in phase with and thus simply augment the impulses in the other and do not double the forcing frequency as might be expected.

The variation from exactly one-half the fundamental frequency of the manifold may be caused by one or more factors such as the diameter of the manifold, the compression ratio or the piston displacement of the engine. By increasing the compression ratio or piston displacement or decreasing the diameter of the manifold, the suction at the valves may be greatly increased and stronger impulse will be given to the system. Maximum supercharging, therefore, may occur at engine speeds other than that corresponding exactly to a fraction of the calculated resonant frequency of the manifold. In any event, this variation is well within engineering tolerances and within the normal errors in calculating the operating characteristics of internal combustion engines.

It is believed that the operation of the manifold is as follows. Assuming the system to be at rest, one of the intake valves at the end of the branch 13 of the manifold 10 opens and the movement of the piston causes suction and the formation of a negative pressure wave which travels along the pipe toward the T 11. The negative pressure at the T 11 draws a charge of fuel and air therefrom and also from the branch 14 of the manifold. This results in the negative pressure wave continuing along the branch 14 of the manifold toward the valves at the end thereof and also in the formation of a positive pressure wave at the T 11 which starts through the manifold along the branch 13. If a valve at the end of branch 13 is closed at the moment the positive pressure wave arrives, this wave will be reflected back along this branch. Similarly, if a valve at the end of branch 14 opens at the moment the negative pressure wave arrives there, a still greater negative pressure will be created in the manifold by the suction from the cylinder and this reinforced negative pressure wave will start back along the manifold toward the carburetor 12.

Both the positive and negative pressure waves arrive at the T 11 at substantially the same time when the manifold is operating under resonant conditions. Consequently, the returning positive pressure wave to 14 will be larger than the original wave in branch 13, and the negative pressure wave in branch 13 will be greater also. Thus, the operation of the manifold is to reinforce the waves of pressure and rarifaction in the manifold pipe, which reinforcement results in the increased supercharging effect.

For best operation, it has been determined that the leg 11' of the T 11 should be kept as short as possible. Tests with different lengths of pipe between the manifold 10 and the carburetor 12 have shown that, in every instance, an increase in the length of the pipe results in a decrease in the power output of the engine. It is probable that the waves coming from the carburetor are out of phase with those in the manifold and thus the farther away the carburetor is, the more out of phase will be the pulsations from the carburetor and those in the manifold, thus reducing the resonance effect.

With a supercharged engine, the same conditions in the manifold 10 may be maintained if a long pipe is connected to the supercharger outlet having a natural frequency substantially equal to the resonant frequency of the manifold or a multiple of the manifold frequency, so that two systems are obtained whose frequencies are synchronized. Thus, use of the present invention greatly increases the efficiency of a supercharged engine.

Such an arrangement is shown in Figure 2 of the drawing, where the T 21 of the manifold 20 is connected to an inlet pipe 22 which is connected to a supercharger 23 so that the fuel and air are supplied through the branches 24 and 25 to the cylinder. The length of the pipe should be such that the pulsations therein will be synchronized with the fundamental frequency of the manifold or a multiple thereof. For example, in conjunction with a manifold 20 having the dimensions of the manifold 10 of Figure 1, a convenient length for the inlet pipe 22 may be about five feet so that the fundamental frequency of the pipe 22 is about 105. As illustrated in Figure 2, the inlet pipe 22 does not necessarily have to be straight.

From the foregoing description of typical forms of my invention, it will be apparent that I have produced novel types of manifolds which greatly increase the efficiency of internal combustion engines. It will be understood that there can be many variations made in the shape and form of manifolds, as long as they are tuned substantially to the forcing frequency of the engine, or a multiple thereof, and that such manifolds and supercharger inlet pipes and manifolds may be applied to "in-line," "V-type" or "pancake" engines with equal facility without departing from the invention. Therefore, the forms of the invention described above should be considered as illustrative and not as limiting the scope of the following claims.

I claim:

1. An intake manifold for internal combustion engines comprising a tube having branches each communicating with a carburetor and intake ports of an internal combustion engine, said branches being of such length as to have a resonant frequency which is substantially equal to or a multiple of the forcing frequency of said engine at maximum brake means effective pressure.

2. An intake manifold for internal combustion engines comprising a tube having branches, each branch communicating with a carburetor and intake ports of an internal combustion engine, and having a fundamental resonant frequency substantially twice the forcing frequency of said engine at maximum brake mean effective pressure.

3. An intake manifold for internal combustion engines comprising an elongated tube communicating at opposite ends with intake ports of an internal combustion engine having an intake T at substantially its mid-point, said tube having a fundamental resonant frequency substantially equal to the forcing frequency of said engine at maximum brake mean effective pressure.

4. An intake manifold for internal combustion engines comprising an elongated tube communicating at opposite ends with intake ports of an internal combustion engine having an intake T at substantially its mid-point, said tube having a fundamental resonant frequency substantially a multiple of the forcing frequency of said engine at maximum brake mean effective pressure.

5. An intake manifold for internal combustion engines comprising an elongated tube communicating at opposite ends with intake ports of an internal combustion engine and having substantially at its mid-point an intake T, said tube being tuned to substantially a multiple of the frequency of the suction impulses of said engine at maximum brake mean effective pressure and having a length substantially equal to one-half of the length of a wave at its tuned frequency.

6. An intake manifold for internal combustion engines comprising an elongated tube communicating at opposite ends with intake ports of an internal combustion engine and having substantially at its mid-point an intake T, said tube being tuned to substantially double the frequency of the suction impulses of said engine at maximum brake mean effective pressure and having a length substantially equal to one-half of the length of a wave at its tuned frequency.

7. An intake manifold for internal combustion engines comprising an elongated tube communicating at opposite ends with intake ports of an internal combustion engine and having substantially at its mid-point an intake T, said tube being tuned to substantially the frequency of the suction impulses of said engine at maximum brake mean effective pressure and having a length substantially equal to one-half of the length of a wave at its tuned frequency.

8. An intake manifold for internal combustion engines comprising a substantially U-shaped tube having its opposite ends communicating with intake ports of an internal combustion engine and an intake T at substantially its mid-point, said tube being tuned to resonate at substantially double the frequency of the suction impulses of said engine at maximum brake mean effective pressure and having a length equal to one-half a wave length at its resonant frequency.

ALFRED T. GREGORY.